United States Patent [19]

Sato

[11] Patent Number: 5,414,335
[45] Date of Patent: May 9, 1995

[54] DEVICE FOR CONTROLLING THE ANGLE OF THE OPTICAL AXIS OF A HEADLAMP LIGHT

[75] Inventor: Yoshihiro Sato, Tokyo, Japan

[73] Assignee: Harada Kogyo Kabushiki Kaisha, Tokyo, Japan

[21] Appl. No.: 44,981

[22] Filed: Apr. 8, 1993

[51] Int. Cl.6 .......................................... B60Q 1/076
[52] U.S. Cl. ...................................... 318/466; 362/66; 307/10.8
[58] Field of Search ............... 318/264, 265, 266, 286, 318/466, 467, 468; 362/61, 66, 257, 269, 271, 272, 285, 286; 307/9.1, 10.1, 10.8

[56] References Cited

U.S. PATENT DOCUMENTS 4,574,334  3/1986  Igura .
4,737,656  4/1988  Gottlieb .
5,010,457  4/1991  Ohmamyuda et al. .

Primary Examiner—Bentsu Ro
Attorney, Agent, or Firm—Koda & Androlia

[57] ABSTRACT

A device for controlling the angle of an optical axis of a headlamp which is advantageous in which the device is compact, light-weight and relatively inexpensive to manufacture and in which accurate optical axis angle control that corresponds to the operation of the operation switch can be achieved at all times regardless of the number of optical axis angle controllers used.

The device comprises: an operation switch which includes a potentiometer for setting a control voltage, a motor which variably controls the angle of the optical axis of the headlamp based upon the control voltage generated by the operation switch, an optical axis angle voltage generator that includes a potentiometer for generating an optical axis angle voltage of the headlamp which is variably controlled by the motor, and a comparative controller which compares the optical axis angle voltage with the control voltage and then causes the motor to rotate in a direction in which the difference between the two voltages disappears. The optical axis angle voltage generator further includes a voltage setting resistance R connected in series to a power supply, and the potentiometer of this voltage generator is in a parallel connection with the potentiometer of the operation switch.

1 Claim, 3 Drawing Sheets

DEVICE FOR CONTROLLING THE ANGLE OF THE OPTICAL AXIS OF A HEADLAMP LIGHT

BACKGROUND OF THE INVENTION

1. Field of the Invention

The present invention relates to a device for controlling the angle of an optical axis of a headlamp which can be used for a variable control of the angle of an optical axis of headlamps of, for example, automobiles and more particularly to an improvement in a control circuit for a headlamp optical axis control device.

2. Prior Art

Generally, in headlamp optical axis control devices of this type, two optical axis angle controllers (headlamp actuators) are installed in symmetrical positions on the left and right sides of a vehicle so that the controllers correspond to the respective headlamps installed on the left and right sides of the vehicle. Each of these optical axis angle controllers comprises: a motor which variably controls the angle of the optical axis of the headlamp on the basis of a control voltage set via an operation switch which includes a control voltage setting potentiometer; an optical axis angle voltage generating means including a potentiometer which generates a voltage corresponding to the angle of the optical axis of the headlamp that is controlled by the motor; and a comparative control means which makes a comparison between the optical axis angle voltage generated by the optical axis angle voltage generating means and the control voltage set by the operation switch and then causes the motor to rotate in a direction in which the difference between the two voltages obtained by the comparison approaches zero.

Compared to devices that use expensive electronic circuit components such as comparators, transistor arrays, motor drivers, etc., the conventional device as described above has advantages in that they can be built relatively inexpensively and in that they are compact and light-weight. However, they have problems. If one of the two optical axis angle controllers malfunctions, the optical axis can only be controlled by the remaining optical axis angle controller. This causes the circuit constants of the control circuit to be changed. The result is that an accurate optical axis angle control in response to the operation of the operation switch cannot be achieved, and the operation is performed with errors.

SUMMARY OF THE INVENTION

Accordingly, the object of the present invention is to provide a device for controlling the angle of the optical axis of a headlamp which is advantageous in that it is compact, light-weight and relatively inexpensive to manufacture and which is able to perform accurate optical axis angle control in response to the operation switch at all times; regardless of the number of the optical axis angle controllers used.

The present invention adopts the means as follows in order to solve the problems and achieve the object:

In particular, the device of the present invention includes: an operation switch which includes a selectable switch connected to a plurality of series-connected resistances for setting a control voltage, the selectable switch and the resistances are hereinafter collectively called a "potentiometer" because of their similarity; a motor which variably controls the angle of the optical axis of a headlamp based on the control voltage set by the operation switch; an optical axis angle voltage generating means which includes a potentiometer for generating an optical axis angle voltage for the headlamp that is controlled by the motor; and a comparative control means which makes a comparison between the optical axis angle voltage generated by the optical axis angle voltage generating means and the control voltage set by the operation switch and then causes the motor to rotate in a direction in which the difference between the two voltages approaches zero, and in the above structure, the optical axis angle voltage generating means further includes a voltage setting resistance which is connected in series to a power supply, and the potentiometer for generating the optical axis angle voltage is in a parallel connection with the potentiometer for setting the control voltage in the operation switch.

With the above structure, the present invention provides the following effects: When the device as described above is in use with each optical axis controller being connected to the operation switch, the voltage setting resistances in the respective optical axis controllers are connected in parallel to each other, and so are the potentiometers for generating the optical axis angle voltage. Accordingly, as long as resistance elements which have the equal resistance values are used for the voltage setting resistances and optical axis angle voltage generating potentiometers of the optical axis angle voltage generating means in each optical axis angle controller, the resistance ratio between each voltage setting resistance and potentiometer will be maintained at a constant value regardless of how many optical axis angle controllers are installed. As a result, no fluctuation in the potential occurs at both ends of the optical axis angle voltage generating potentiometers, and an accurate optical axis angle control in response to the operation of the operation switch can be achieved easily at all times regardless of the number of optical axis angle controllers used.

BRIEF DESCRIPTION OF THE DRAWINGS

FIGS. 1(a) and 1(b) show a headlight optical axis angle control device of the present invention in which FIG. 1(a) is a block diagram of the structure of the device in a schematic manner and FIG. 1(b) is a side view of the external appearance of one of the headlight actuators;

FIGS. 3(a) and 3(b) illustrate the essential portions of the electrical circuit of an embodiment of the headlamp optical axis angle control device of the present invention in which FIG. 3(a) is an equivalent circuit diagram of the area defined by the broken line A in FIGS. 2 and 3(b) is a circuit diagram of the area defined by the broken line B in FIG. 2.

DETAILED DESCRIPTION OF THE INVENTION

Figure 1A:
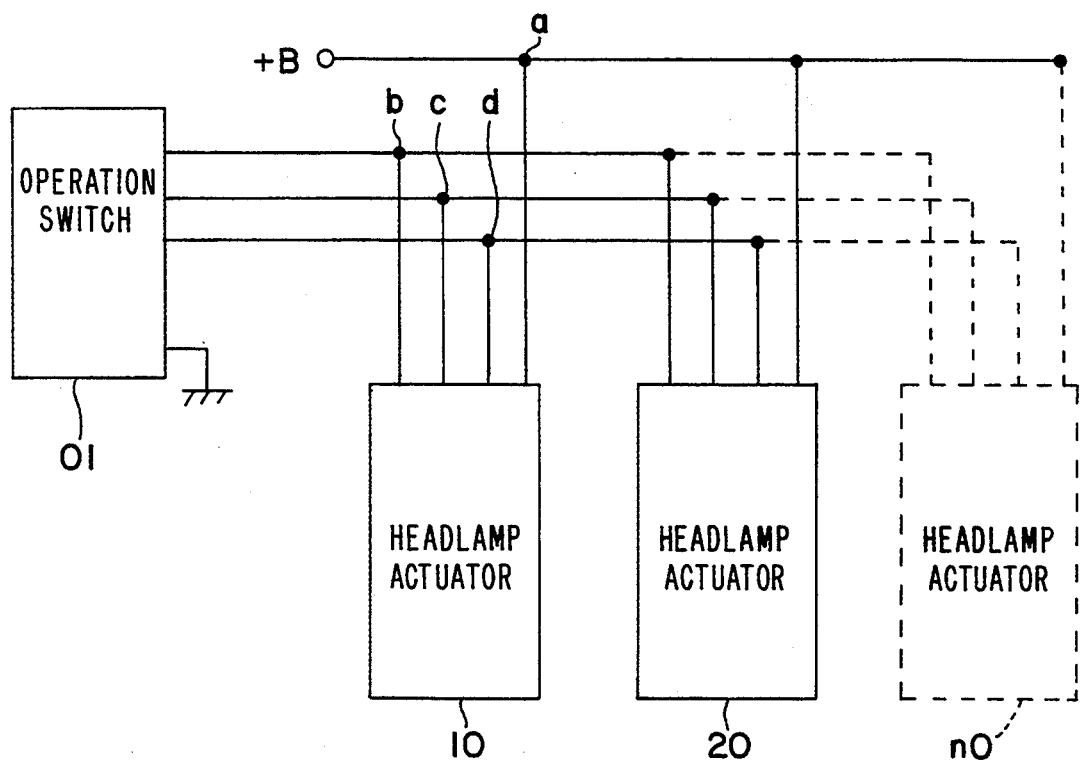

FIG. 1(a) is a block diagram schematically illustrating the structure of the headlamp optical axis angle control device according to one embodiment of the present invention. As shown in this Figure, a plurality of headlamp actuators 10, 20, n0, which constitute optical axis angle controllers, are connected in parallel to an operation switch 01.

Figure 1B:
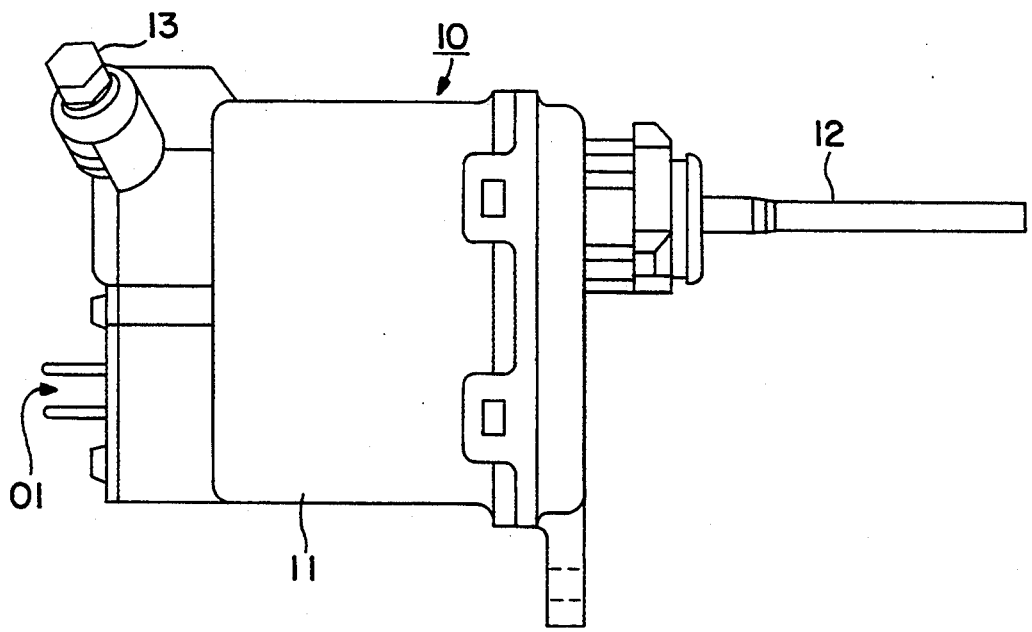

FIG. 1(b) is a side view of the external appearance of one of the headlamp actuators which is the headlamp actuator 10 shown in FIG. 1(a). A motor (not shown) is accommodated inside a case 11 of the headlamp actuator 10, and the rotational force of this motor is transmitted to an aiming shaft 12, that is used for an optical axis angle control, via speed reduction gears (not shown). Reference numeral 13 is an initial angle setting mechanism which is used for initially setting the angle of the optical axis of the headlamp. This mechanism 13 is coupled to the base end of the aiming shaft 12 inside the case 11.

Figure 2:
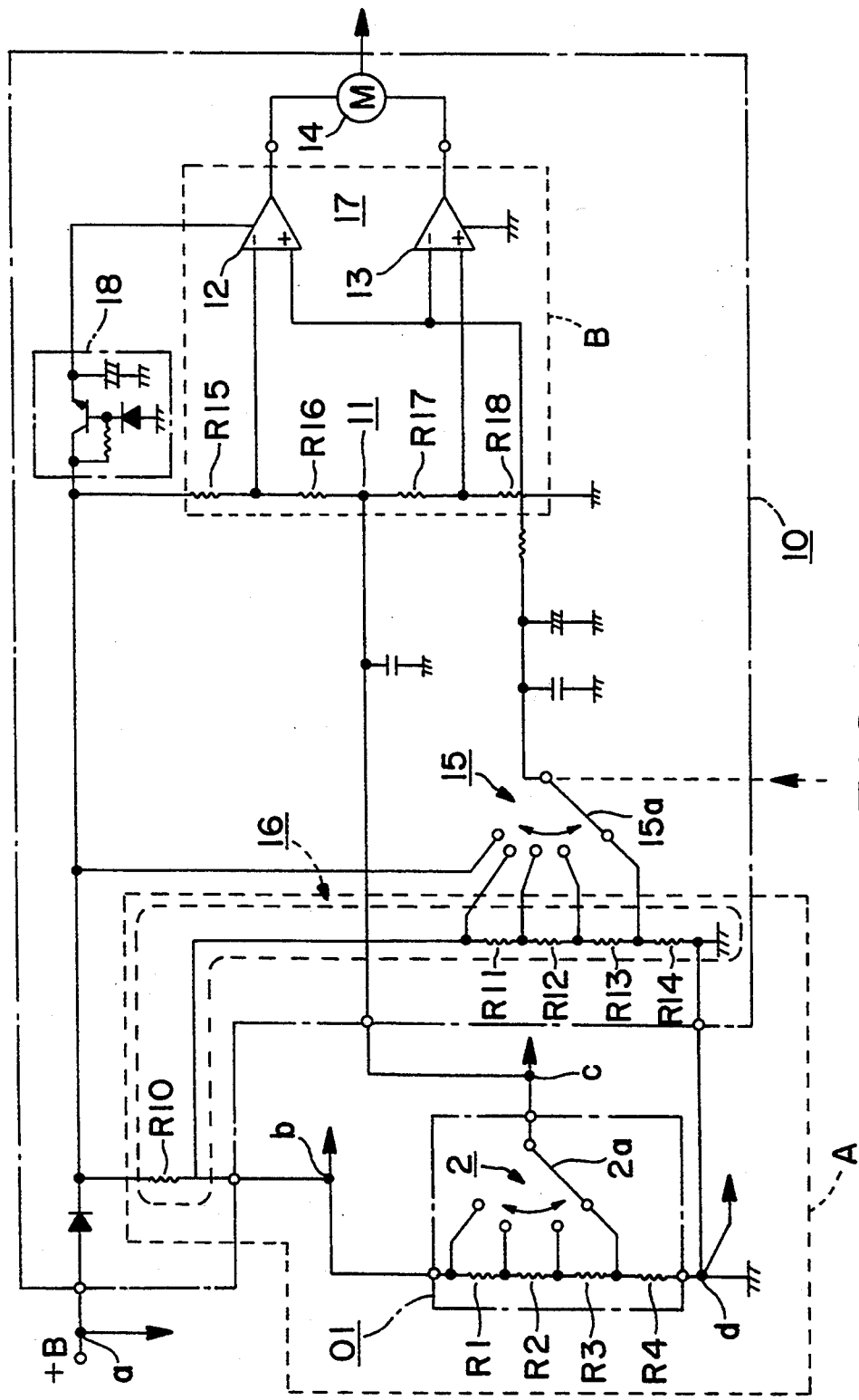
FIG. 2 illustrates the electrical circuit of the operation switch and one of the headlight actuators in an embodiment of the headlight optical axis angle control device of the present invention.

FIG. 2 is a diagram showing the electrical circuit of the operation switch 01 and the headlamp actuator 10. As shown in FIG. 2, the operation switch 01 comprises mainly a potentiometer 2 which is for setting a control voltage. The potentiometer 2 has a resistance element that is formed by resistances R1 through R4 connected in series. Thus, by operating a change-over switch 2a of the control voltage setting potentiometer 2, it is possible to set a control voltage which corresponds to the operation and controls the angle of the optical axis. The set control voltage is outputted via an output terminal c.

The headlamp actuator 10 includes a motor 14, an optical axis angle voltage generating means 16 and a comparative control means 17. The motor 14 variably controls the angle of the optical axis of the headlamp based upon the control voltage from the operation switch 01. The optical axis angle voltage generating means 16 includes a potentiometer 15 which generates a voltage that corresponds to the angle of the optical axis of the headlamp which is variably controlled by the motor 14. The comparative control means 17 compares the optical axis angle voltage generated by the optical axis angle voltage generating means 16 with the control voltage set by the operation switch 01 and then causes the motor 14 to rotate in a direction in which the difference between the two voltages approaches zero. Reference numeral 18 is a stabilizing power supply circuit.

The optical axis angle voltage generating means 16 further includes a voltage setting resistance R10 along with the optical axis angle voltage generating potentiometer 15. The voltage setting resistance R10 is connected in series to a power supply B. The optical axis angle voltage generating potentiometer 15 has a resistance element that is formed by resistances R11 through R14 connected in series. The optical axis angle voltage is generated by operating a change-over switch 15a of the optical axis angle voltage generating potentiometer 15 and sent to the comparative control means 17. The optical axis angle voltage generating potentiometer 15 is arranged so as to be in a parallel connection with the control voltage setting potentiometer 2 of the operation switch 01.

The comparative control means 17 consists of a voltage-dividing circuit 11 and operational amplifiers 12 and 13. The voltage-dividing circuit 11 includes resistances R15 through R18 connected in series.

Figure 3A:
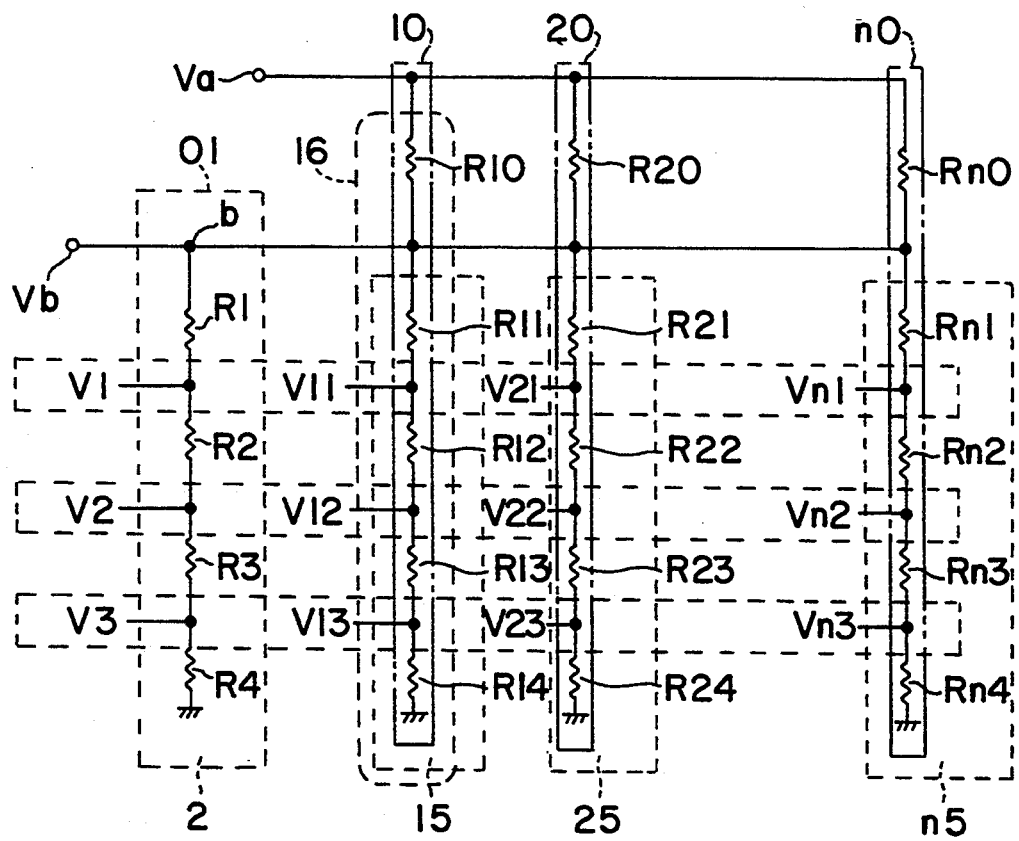

FIG. 3(a) is an equivalent circuit diagram of the portion surrounded by the broken line A in FIG. 2. FIG. 3(a) illustrates a state in which a plurality of headlamp actuators 10, 20, . . . n0 are connected. The respective resistances shown in FIG. 3(a) are subject to the following resistance conditions:

R10=(equals to) R20 . . . =Rn0

R1=R11=R21 . . . =Rn1

R2=R12=R22 . . . =Rn2

R3=R13=R23 . . . =Rn3

R4=R14=R24 . . . =Rn4

The voltage value at a point Vb is focussed in the following description.

In use of the device, in other words, when each of the headlamp actuators 10, 20, . . . n0 is connected to the operation switch 01 as shown in FIG. 3(a), the voltage setting resistances R10, R20, . . . Rn0 in the respective headlamp actuators 10, 20, . . . n0 are connected in parallel with each other, and so are the potentiometers 15, 25, . . . n5. Accordingly, as long as the resistance conditions are satisfied so as to be as shown above, which is that resistance elements having the equal resistance values in each of the headlamp actuators 10, 20, . . . n0 are used as the voltage setting resistances and optical axis angle voltage generating potentiometers in the optical axis angle voltage generating means 16, the resistance ratio between the voltage setting resistances and potentiometers is kept constant regardless of how many of the headlamp actuators 10, 20, . . . n0 are installed.

In the above, the ratio ra1/rb1 of the resistance value ra1 of the voltage setting resistance R10 in the actuator 10 to the combined resistance rb1 obtained by the resistances R11 through R14 of the potentiometer 15 in the actuator 10 can be 5:1. Likewise, the ratio ra2/rb2 of the resistance value ra2 of the voltage setting resistance R20 in the actuator 20 to the combined resistance rb2 obtained by the resistances R21 through R24 of the potentiometer 25 in the actuator 20 can be also 5:1.

If these two headlamp actuators 10 and 20 are connected as shown in the Figures, then the resistance ratio between the voltage setting resistances and the potentiometers will be equal to the ratio of the combined resistance value (ra1+ra2)/2 of the voltage setting resistances to the combined resistance value (rb1+rb2)/2 of the potentiometers. In order words, $$[(ra1+ra2)/2] \div [(rb1+rb2)/2] = (ra1+ra2) \div (rb1+rb2)$$

In the above, since ra1=ra2, and rb1=rb2 from the resistance conditions, $$(ra1 + ra2) \div (rb1 + rb2) = (2 \cdot ra1) \div (2 \cdot rb1)$$
$$= ra1/rb1$$

In other words, the resistance ratio between the voltage setting resistances and the potentiometers is maintained constant regardless of the number of the headlamp actuators 10, 20, . . . n0 installed. Accordingly, no fluctuation in the voltage value occurs at the position Vb, i.e., no fluctuation occurs in the potential at the respective ends of the optical axis angle voltage generating potentiometers 15, 25, . . . n5.

Thus, the potentials V11, V21, . . . Vn1 at the respective voltage-dividing points of the optical axis angle voltage generating potentiometers 15, 25, n5 are equal, and these potentials are the same as the potential V1 in the control voltage setting potentiometers 2 of the operation switch O1. Likewise, the potentials V12, V22, . . . Vn2 at the respective voltage-divided points of the optical axis angle voltage generating potentiometers 15, 25, ... n5 are equal, and these potentials are the same as the potential V2 in the control voltage setting potentiometer 2 of the operation switch O1. Furthermore, the potentials V13, V23, ... Vn3 at the respective voltage-divided points of the optical axis angle voltage generating potentiometers 15, 25, ... n5 are equal, and these potentials are the same as the potential V3 in the control voltage setting potentiometer 2 of the operation switch O1.

As a result of the above arrangement, no change occurs in the circuit constants of the control circuit even in cases where one of a pair of, for example, the headlamp actuators 10 and 20 malfunctions and the optical axis control must be performed using only the remaining headlamp actuator. Accordingly, an accurate optical axis angle control that corresponds to the operation state of the operation switch O1 is achieved without any error.

Figure 3B:
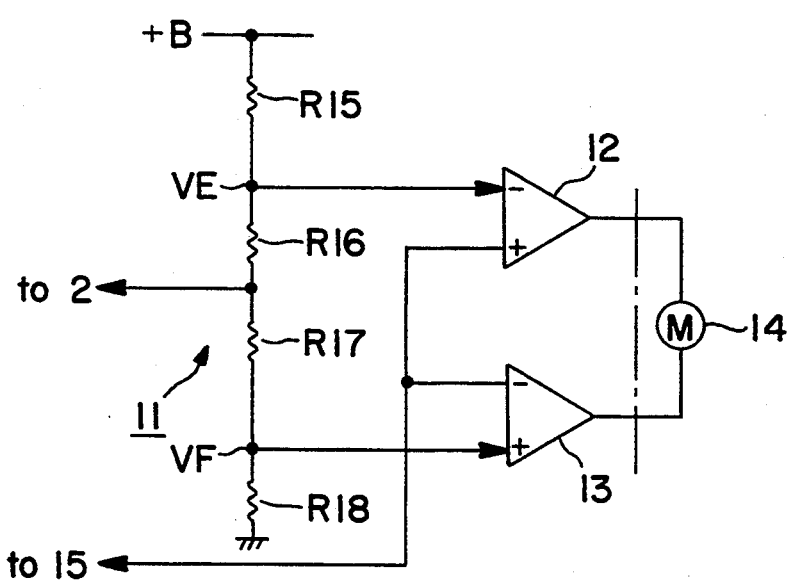

FIG. 3(b) is a circuit diagram of the area surrounded by the broken line B in FIG. 2. As shown in FIG. 3(b), the control voltage from the operation switch O1 is converted into potentials VE and VF by the resistances R15 through R18 of the voltage-dividing circuit 11, and these potentials are inputted into the respective input terminals of the operational amplifiers 12 and 13. Thus, the operational amplifiers 12 and 13 can compare the control voltage from the operation switch O1 with the optical axis angle voltage from the optical axis angle voltage generating potentiometer 15 in the optical axis angle voltage generating means 16 so as to cause the motor 14 to rotate in a direction in which the difference between the two voltages approaches zero. When the optical axis angle voltage becomes equal to the control voltage, the same value of outputs are outputted from the operational amplifiers 12 and 13, and the rotation of the motor 14 is stopped.

The present invention is not limited to the embodiment described above. It goes without saying that various modifications are possible within the spirit of the present invention.

According to the present invention, expensive electronic circuit components such as comparators, transistor arrays, motor drivers, etc. are not used. Accordingly, the device of the present invention can be compact, light-weight and manufactured relatively inexpensively. In addition, the resistance elements which are identical in the resistance value are used as the voltage setting resistances and the optical axis angle voltage generating potentiometers of the optical axis angle voltage generating means in each optical axis angle controller. Accordingly, the resistance ratio between the voltage setting resistances and the potentiometers are kept constant regardless of how many optical axis angle controllers are used. Accordingly, the optical axis angle control device for a headlamp of this invention can accomplish an accurate optical axis angle control that corresponds to the operation of the operation switch at all times regardless of the number of optical axis angle controllers used.

What is claimed is:

1. A device for controlling an angle of an optical axis of at least two headlamp lights comprising:
    an operation switch which includes a first variable resistance means for setting a control voltage;
    an optical axis angle controller for each of said at least two headlamp lights, each of said optical axis angle controllers comprising:
    a motor which variably controls an angle of an optical axis of a headlamp based on said control voltage set by said operation switch;
    an optical axis angle voltage generating means which includes a second variable resistance means and generates a voltage that corresponds to an angle of said optical axis of said headlamp which is variably controlled by said motor, said second variable resistance means of each of said optical axis angle controllers being equal in resistance and said second variable resistance means of each of said optical axis angle controllers and said first variable resistance means being connected in parallel; and
    a comparative control means which compares an optical axis angle voltage generated by said optical axis angle voltage generating means with said control voltage set by said operation switch and then causes said motor to rotate in a direction in which a difference between said two voltages approaches zero; and
    a voltage setting resistance connected in series to a power supply and said second variable resistance means.

* * * * *